United States Patent [19]
Noé

[11] Patent Number: 5,266,770
[45] Date of Patent: Nov. 30, 1993

[54] STRIP WELDING MACHINE

[75] Inventor: Oskar Noé, Mülheim, Fed. Rep. of Germany

[73] Assignee: BWG Bergwerk-und Walzwerk-Maschinebau GmbH, Duisberg, Fed. Rep. of Germany

[21] Appl. No.: 753,212

[22] Filed: Aug. 30, 1991

[30] Foreign Application Priority Data

Oct. 20, 1990 [EP] European Pat. Off. ........ 90120156.6

[51] Int. Cl.$^5$ ............................................. B23K 26/00
[52] U.S. Cl. ........................ 219/121.63; 219/121.82; 219/121.84
[58] Field of Search ............... 219/121.63, 121.64, 219/121.82, 121.84

[56] References Cited

U.S. PATENT DOCUMENTS

| 4,623,777 | 11/1986 | Aihara et al. | 215/121.6 |
| 4,626,651 | 12/1986 | Taniguchi et al. | 215/121.63 |
| 4,840,303 | 6/1989 | Fujii et al. | 228/164 |

FOREIGN PATENT DOCUMENTS 0151848 8/1985 European Pat. Off. .

Primary Examiner—C. L. Albritton
Attorney, Agent, or Firm—Anderson Kill Olick & Oshinsky

[57] ABSTRACT

A strip welding machine for butt-welding cut surfaces of a strip beginning and a strip end of metal strips to be connected is described. The welding seam is manufactured with a laser welding head. In order to obtain a plane and parallel and gap-free butt joint of the cut surfaces, two separately mounted cutting tools are provided. Each cutting tool has an upper knife and two lower knives, wherein each upper knife is moved virtually without a gap between the two lower knives. Consequently, the cut surfaces at the strip end and the cut surfaces at the strip beginning of the metal strips to be connected are manufactured with equal cutting forces, so that dimensional inaccuracies cannot occur.

9 Claims, 4 Drawing Sheets

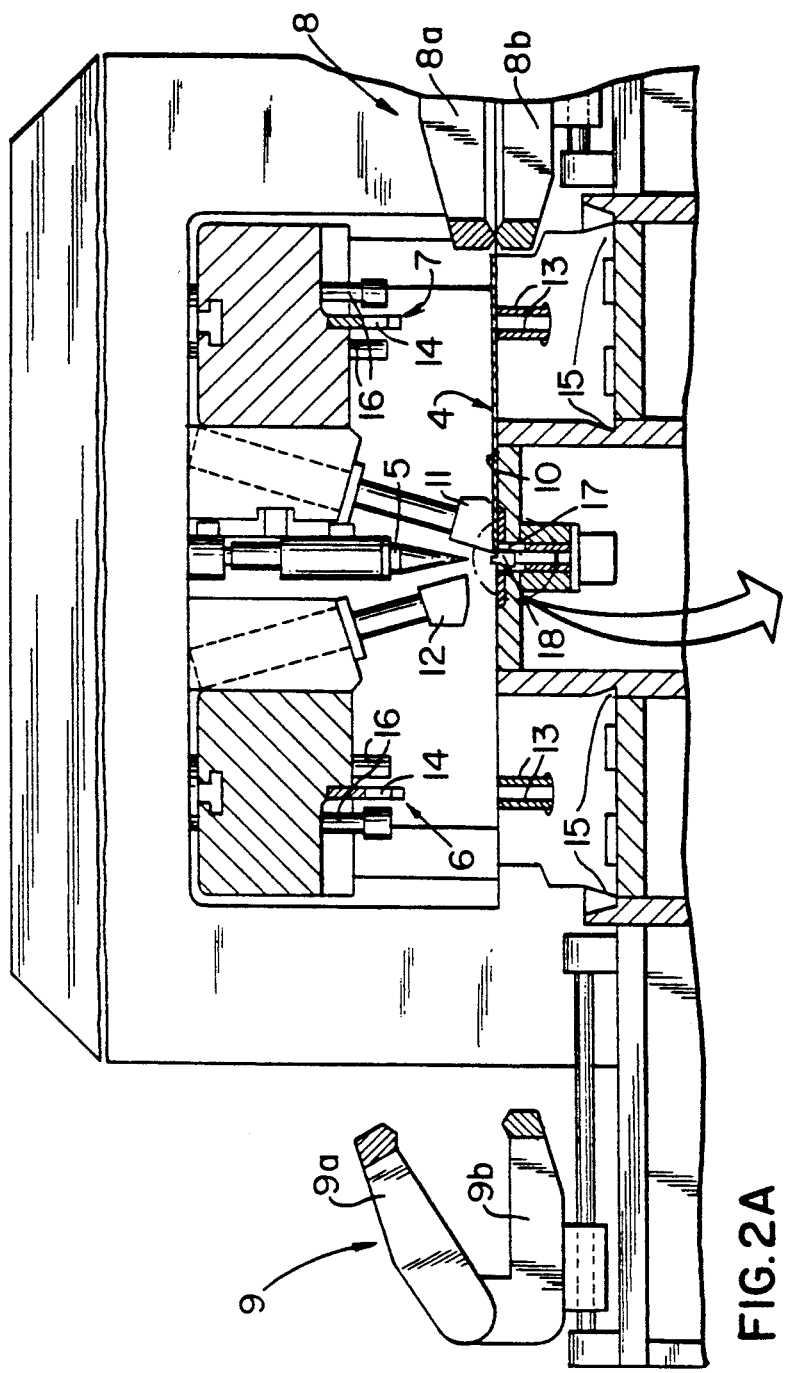
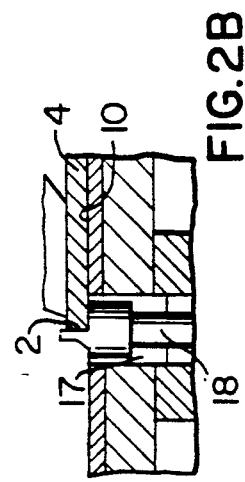
FIG.2A
FIG.2B

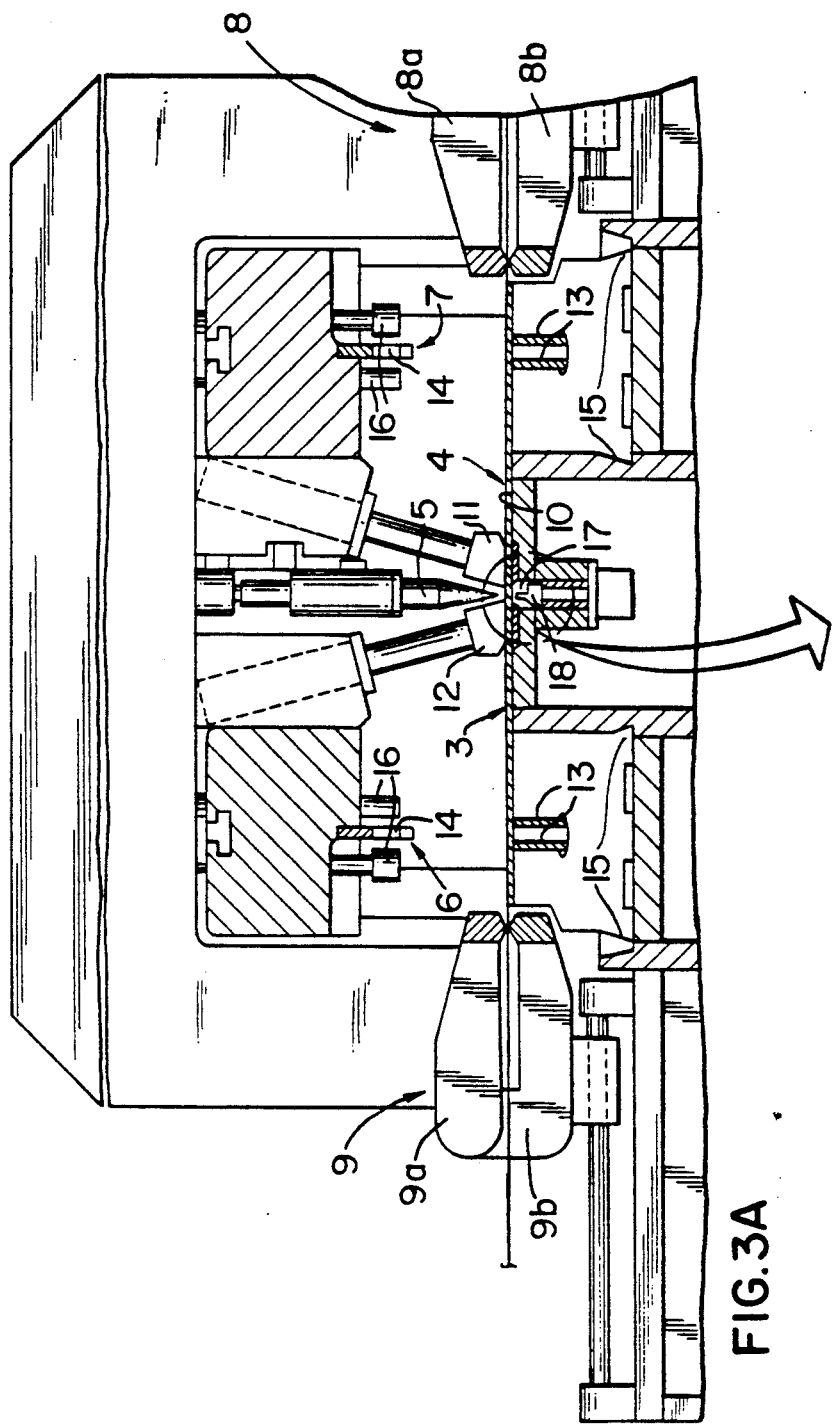
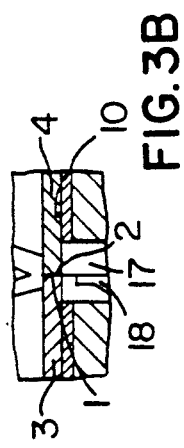
FIG. 3A
FIG. 3B

STRIP WELDING MACHINE

BACKGROUND OF THE INVENTION

1. Field of the Invention

The present invention relates to a strip welding machine for butt-welding, abutting cut surfaces of a strip beginning and a strip end of metal strips to be connected. The strip welding machine includes:

a laser welding apparatus with a laser welding head;

a cutting device for producing the cut surfaces, the cutting device having cutting tools which can be lowered perpendicularly onto the two metal strips;

pairs of clamping tongues which can be moved in longitudinal direction of the strips, each pair of clamping tongues including an upper clamping tongue and a lower clamping tongue for clamping the metal strips to be connected in the region of the strip beginning and the strip end and for moving the cut surfaces together onto a support surface underneath the laser welding head until a gap-free butt joint is formed between the strip beginning and the strip end; and pressing elements for pressing the strip beginning and the strip end against the support surface on both sides of the abutting cut surfaces.

2. Description of the Related Art

A strip welding machine of the above-described type is known from European patent 0 151 848. This known strip welding machine is preferably used in continuously operating strip processing lines. In such strip processing lines, after a coil has traveled through, the strip end thereof and the strip beginning of a new coil must be connected to each other. In the known strip welding machine, this is done by means of laser welding. Laser welding is intended to prevent the formation of projections or thickened portions in order to ensure the planeness of the metal strips even in the area of the connecting seam. However, laser welding works only if exactly parallel and plane cut surfaces and virtually gap-free abutting cut surfaces are available for the welding process. These requirements can hardly be met by the known strip-welding machine. This is because the cutting tools for the cut surface at the strip beginning and the cut surface at the strip end are combined and together form essentially a single punching unit as the cutting device. Consequently, the cut surfaces at the strip beginning and the strip end are always produced in a single punching or cutting stroke. However, it has been found that such a cutting process results in dimensional defects at the cut edges because of the occurring edge peeling, as well as crack and burr formation. As a result, the cut surfaces are not sufficiently parallel and plane for problem-free laser welding. This poor quality of the cut surfaces leads to defective welding seams.

SUMMARY OF THE INVENTION

Therefore, it is the object of the present invention to provide a strip welding machine of the above-described type in which the cutting device produces parallel and place-cut surfaces of highest precision at a right angle relative to the strip axis for connecting the strip end and the strip beginning by means of laser welding.

In accordance with the present invention, in a strip welding machine of the above-described type, the cutting device comprises separately mounted cutting tools for the cut surfaces at the strip beginning, on the one hand, and at the strip end, on the other hand.

It has surprisingly been found that excellent plane and parallel cut surfaces can be produced when cutting is effected separately at the strip beginning and the strip end by means of separate cutting tools.

In accordance with a preferred embodiment of the present invention, the two cutting tools are constructed as separate punching tools each having a cutting die and a cutting plate so as to form two parallel spaced-apart cutting edges for a double cut. Thus, in this case, cutting forces of identical magnitude occur at both cutting edges of each punching tool, so that excellent cut surfaces are obtained even if strip thicknesses and/or strip widths and/or strip material strengths are different.

In accordance with another embodiment of the invention, the two separately mounted cutting tools each have two lower knives and an upper knife which moves between the two lower knives virtually without forming a gap.

Thus, in both embodiments precision cutting tools for producing plane and parallel cut surfaces at the ends of the metal strips, to be connected to each other by welding, are available, without having to expect dimensional defects which would lead to defective welding seams in laser welding.

In accordance with another important feature of the present invention, the cutting effect of the upper knives is optimized by providing the upper knives with a roof-shaped contour.

In order to increase the wear resistance, the upper knives and the lower knives are advantageously coated with titanium nitrite.

The precision of the cutting tools is further improved by securing the position and angle of the cutting tools relative to the laser head by means of prisms in a frictionally engaging and positively engaging manner.

In order to simplify the assembly of the apparatus, the cutting tools are movable transversely of the longitudinal direction of the strip.

The invention further provides that each cutting tool has, on both sides of its upper knife, lowerable holding-down units for holding down the metal strips on both sides of the lower knives during the cutting procedure. This also contributes to clean-cut surfaces.

In order to a obtain a problem-free alignment of the plane and parallel-cut surfaces which abut each other for the welding procedure, the pressing elements may be constructed as welding clamps which can be lowered onto the support surface.

In accordance with another feature of the present invention, the support surface is constructed as a welding table with a guide gap underneath the laser welding head for a stop member for the respective strip end or the respective strip beginning, wherein the stop member is movable above the plane of the table and is lowerable below the plane of the table. As a result, an excellent positioning of the strip beginning and the strip end, or of the finely abutting cut surfaces underneath the laser welding head is obtained.

An integrated sensor registers the position of the abutting cut surfaces and, consequently, of the welding joint relative to the target path. The laser welding head travels in rapid motion to the abutting cut surfaces. Laser welding is effected at a preprogrammed operating speed. The welding parameters, such as horizontal and vertical target positions, are monitored, so that reproducible welding results can be obtained. After the welding process, the laser welding head travels in rapid motion back into its initial position. The welding clamps are opened. The metal strips which are welded together are raised, so that the processing line can start up. Shortly before the next welding cycle, the welding tools, the welding clamps, and the stop member are automatically cleaned, for example, by means of compressed air.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 2 is a schematic side view of the strip welding machine of FIG. 1 shown after the cut surface at the strip end has been moved against the stop member underneath the laser welding head;

FIG. 2B is a crossectional view of an area of FIG. 2A;

FIG. 3 is a schematic side view of the strip welding machine of FIG. 1 shown during the welding procedure;

FIG. 3B is a cross sectional view of an area of FIG. 3A; and

DESCRIPTION OF THE PREFERRED EMBODIMENT

Figure 1:
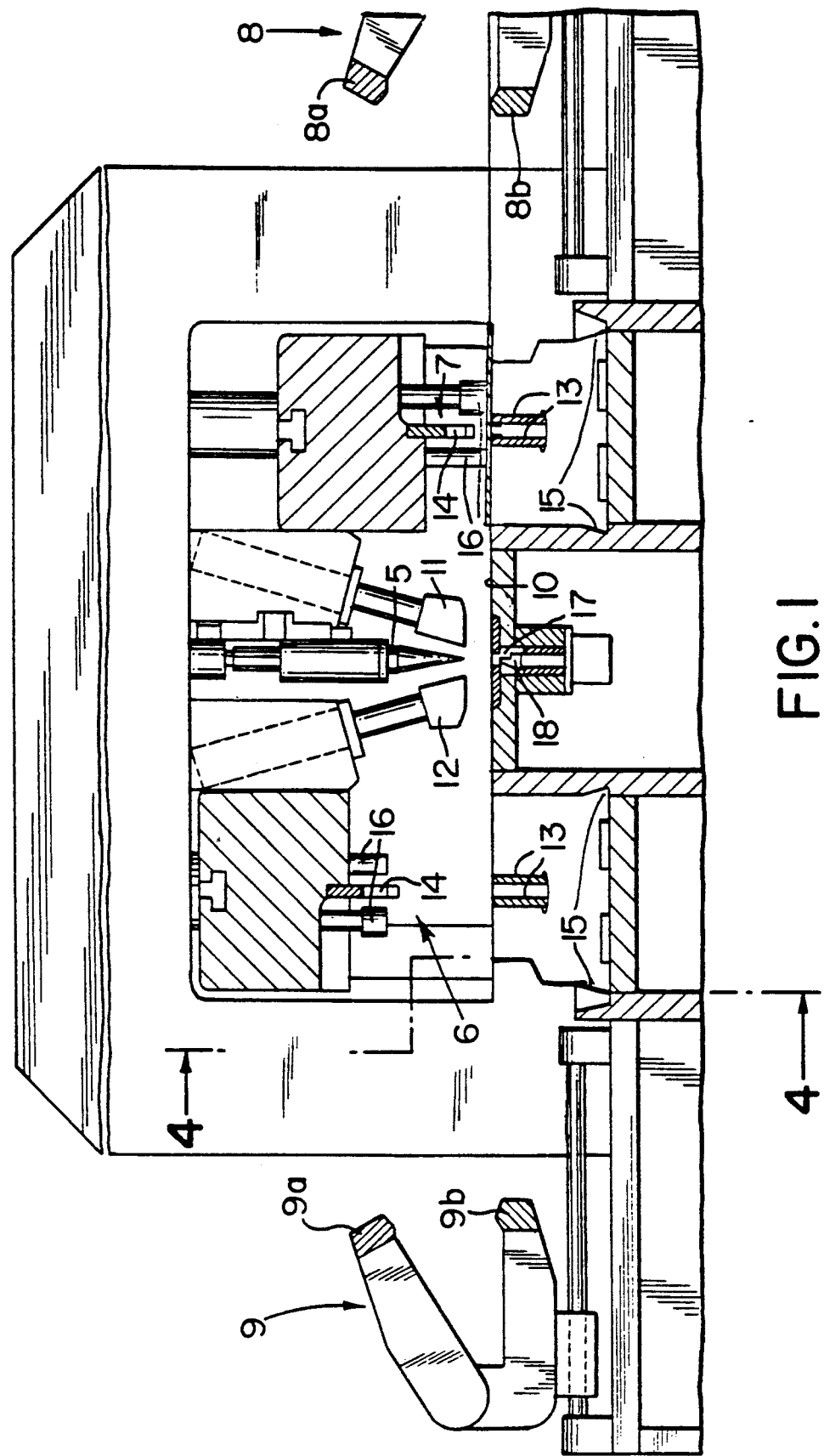
FIG. 1 is a schematic side view of a strip welding machine according to the present invention shown prior to the welding procedure.
Figure 4:
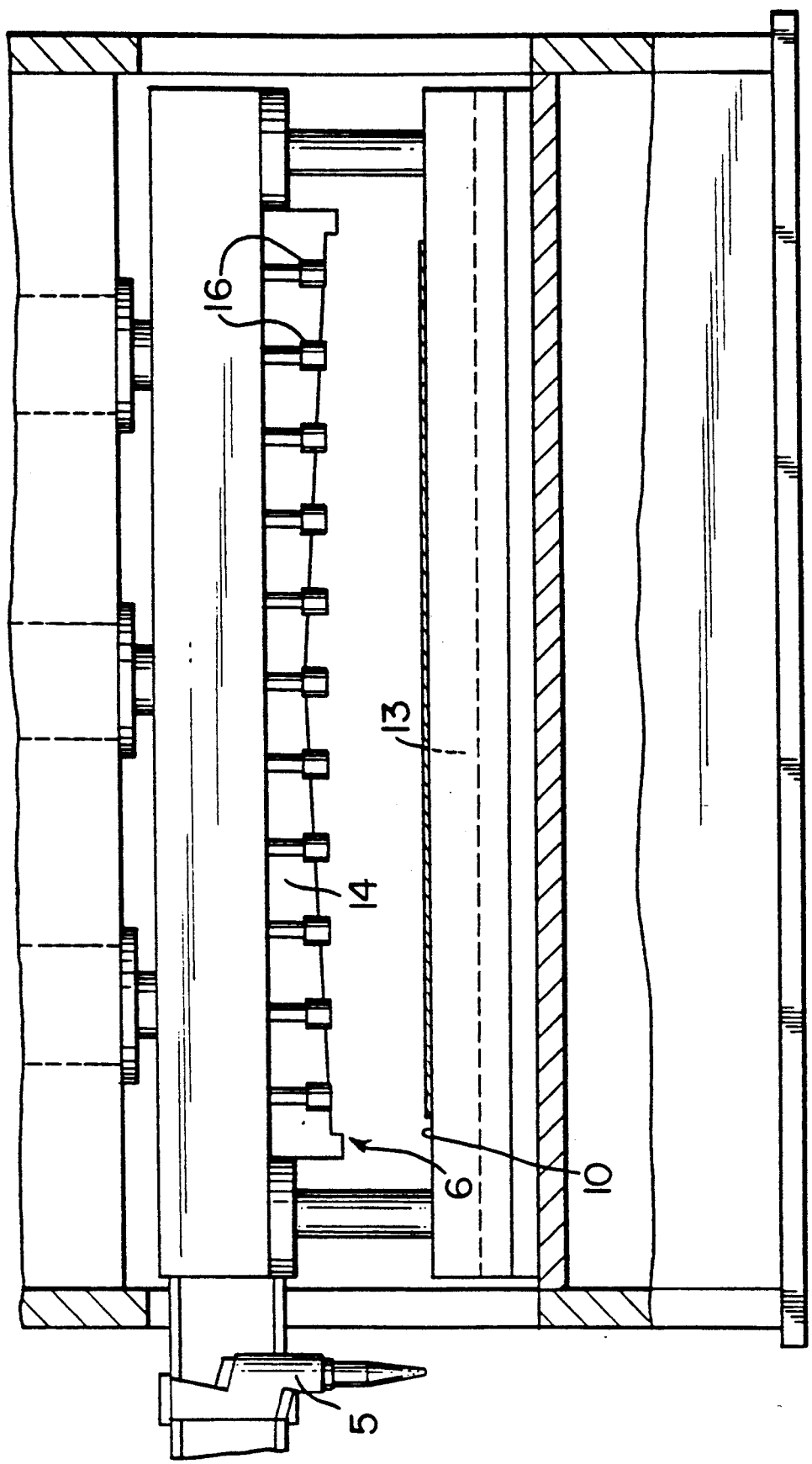
FIG. 4 is a sectional view taken along sectional line A—A of FIG. 1.

The figures of the drawing show a strip welding machine for butt-welding abutting cut surfaces 1, 2 at a strip beginning 3 and a strip end 4 of metal strips to be connected. The strip welding machine includes a laser welding apparatus with a laser welding head 5 as well as a cutting device with cutting tools 6, 7 which can be moved downward perpendicularly onto the two metal strips in order to produce the cut surfaces 1, 2.

In addition, the strip welding machine includes pairs of clamping tongues 8,9 which can be moved in longitudinal direction of the strips. The pairs of clamping tongues 8, 9 each have an upper clamping tongue 8a or 9a, a lower clamping 8b or 9b for clamping the metal strip to be connected in the region of the strip beginning 3 and the strip end 4 and for moving together the cut surfaces 1, 2 until a gap-free butt joint is formed on a support surface 10 underneath the laser head 5. The strip welding machine further includes pressing elements 11, 12 for pressing the strip beginning 3 and the strip end 4 on both sides of the abutting cut surfaces 1, 2 against the support surface 10.

The cutting device has cutting tools 6, 7 for producing the cut surfaces 1, 2 at the strip beginning 3 and at the strip end 4. The cutting tools 6, 7 are mounted separately and, thus, are independent of each other. In the illustrated embodiment, the two cutting tools 6, 7 which are mounted separately of each other each have two lower knives 13 and an upper knife 14 which can be moved virtually without leaving a gap between the two lower knives 13. As a result, high-precision, clean, and exactly plane-and-parallel-cut surfaces 1, 2 can be produced. The upper knives 14 have a roof-shaped contour and the upper knives and the lower knives are coated with titanium nitrite.

The cutting tools 6, 7 are secured in a frictionally engaging and positively engaging manner in their positions and angles relative to the laser welding head 5 by means of prisms 15. In addition, the cutting tools 6, 7 can be moved transversely of the longitudinal direction of the strips. Each cutting tool 6, 7 has on both sides of its upper knife 14 lowerable, holding-down devices 16 for holding down the metal strips during the cutting procedure on both sides of the lower knife 13. The strips are held down on the prisms 15 in which the lower knives 13 are mounted. The pressing elements are constructed as welding clamps 11, 12 which can be lowered onto the support surface 10.

The support surface is constructed as a welding table 10 with a guide gap 17 underneath the laser welding head 5 for a stop member 18, for the respective strip end 4, or the respective strip beginning 3, wherein the stop member 18 is mounted underneath the welding table 10 and can be raised in the guide gap 17 above the plane of the table, and can be lowered below the plane of the table.

In order to produce plane and parallel cut surfaces 1, 2, the pair of clamping tongues 8 clamp the advancing metal strip and move the strip end 4 against the stop member 18 which is in its upper position. Subsequently, the respective welding clamp 11 secures the strip end on the welding table 10. The lowerable stop member 18 is moved below the plane of the table. The strip beginning 3 of the subsequent metal strip is now moved with a defined feeding force by means of the pair of clamping tongues 9 against the strip end 4 which is already clamped on the welding table 10 until the cut surfaces 1, 2 at both strip ends form a gap-free butt joint. The strip beginning 3 is then also clamped against the welding table 10 by means of the welding clamp 12. The plane and parallel-cut surfaces 1, 2 are now located without a gap therebetween on the vertical axis of the laser welding head 5. The laser welding head 5 travels in rapid motion downwardly toward the abutting cut surfaces 1, 2 and produces the welded connection at a preprogrammed operating speed and then returns again in rapid motion into its initial position.

While a specific embodiment of the invention has been shown and described in detail to illustrate the application of the inventive principle, it will be understood that the invention may be embodied otherwise without departing from such principles.

I claim:

1. A strip welding machine for butt-welding abutting cut surfaces of a strip beginning and a strip end of metal strips to be connected, comprising:

a laser welding apparatus having a laser welding head;

a cutting device for producing the cut surfaces;

pairs of clamping tongues configured to be moved in longitudinal direction of the strips, each pair of clamping tongues including an upper clamping tongue and a lower clamping tongue for clamping the metal strips to be connected at the strip beginning and at the strip end;

a support surface underneath the laser welding head wherein said clamping tongues move the top surfaces (of what?) together onto said support surface until a gap-free butt joint is formed between the strip beginning and the strip end;

pressing elements for pressing the strip beginning and the strip end against the support surface on both sides of the abutting cut surfaces; and separately mounted cutting tools on the cutting devices for the cut surfaces at the strip beginning and at the strip end, wherein said cutting tools comprise two lower knives and an upper knife which can be inserted between the two lower knives in a nearly gapless manner.

2. The strip welding machine of claim 1, further comprising:

separate punching tools, each having a cutting die; and a cutting plate so as to form two parallel spaced-apart cutting edges for effecting a double cut.

3. The strip welding machine of claim 1, wherein the two separately mounted cutting tools further comprise
two lower knives; and
an upper knife, wherein the upper knife is movable between the two lower knives virtually without forming a gap.

4. The strip welding machine of claim 3, wherein the upper knives have a roof-shaped contour.

5. The strip welding machine of claim 3, wherein the upper knives and the lower knives are coated with titanium nitrate.

6. The strip welding machine of claim 1, further comprising prisms for securing position and angle of the cutting tools in a frictionaly engaging and positively engaging manner.

7. The strip welding machine of claim 3, further comprising lowerable holding down units on each cutting tool on both sides of the upper knives thereof for holding down the metal strips on both sides of the lower knives during cutting.

8. The strip welding machine of claim 1, wherein the pressing elements are welding clamps configured to be lowered onto the support surface.

9. The strip welding machine of claim 1, wherein the support surface is a welding table extending in a plane, and wherein the welding table has a guide gap underneath the laser welding head for a stop member for the strip end and the strip beginning, wherein the stop member is movable above the plane of the table and is lowerable below the plane of the table.

* * * * *